United States Patent
Ki et al.

(10) Patent No.: US 8,416,842 B2
(45) Date of Patent: Apr. 9, 2013

(54) CHANNEL ESTIMATION METHOD AND APPARATUS FOR WIRELESS COMMUNICATION SYSTEM

(75) Inventors: Young Min Ki, Suwon-si (KR); Jae Hong Lee, Seoul (KR); Hun Kee Kim, Seoul (KR); Kyung Seung Ahn, Jeonju-si (KR); Seong Wook Song, Gwacheon-si (KR); Min Sung Hur, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 678 days.

(21) Appl. No.: 12/644,681

(22) Filed: Dec. 22, 2009

(65) Prior Publication Data

US 2010/0158089 A1 Jun. 24, 2010

(30) Foreign Application Priority Data

Dec. 23, 2008 (KR) .................. 10-2008-0132214

(51) Int. Cl.
*H04B 17/00* (2006.01)

(52) U.S. Cl.
USPC ........... 375/224; 375/316; 375/147; 375/150; 375/152; 375/229; 375/231; 375/232; 375/260; 375/340; 375/343

(58) Field of Classification Search .................. 375/316, 375/147, 150, 152, 229, 231, 232, 260, 340, 375/343, 224
See application file for complete search history.

(56) References Cited

U.S. PATENT DOCUMENTS

| | | | | |
|---|---|---|---|---|
| 6,304,299 | B1 * | 10/2001 | Frey et al. | 348/614 |
| 7,697,596 | B2 * | 4/2010 | Li et al. | 375/148 |
| 2001/0046221 | A1 | 11/2001 | Ostman et al. | |
| 2002/0034161 | A1 | 3/2002 | Deneire et al. | |
| 2004/0161022 | A1 * | 8/2004 | Glazko et al. | 375/152 |
| 2004/0233839 | A1 | 11/2004 | Troulis | |
| 2004/0234009 | A1 | 11/2004 | Fimoff et al. | 375/343 |
| 2006/0227887 | A1 * | 10/2006 | Li et al. | 375/260 |
| 2009/0304063 | A1 * | 12/2009 | Ki et al. | 375/232 |

* cited by examiner

*Primary Examiner* — Siu Lee
(74) *Attorney, Agent, or Firm* — Jefferson IP Law, LLP

(57) ABSTRACT

A channel estimation method and apparatus using a self-tracking algorithm is provided for improving channel estimation accuracy. The channel estimation apparatus of a mobile terminal includes a receiver for converting a received radio signal into a baseband signal, a match filter for converting the baseband signal into a digital signal including at least two samples, a channel estimator for buffering the samples, for analyzing multipath signals to predict a maximum power position and multipath energy, and for estimating a channel by selecting a multi-tap at the maximum power position through a slew control, an equalization controller for calculating an equalization tap gain using the multi-tap selected by the channel estimator, and an equalizer for compensating for distortion in the samples output by the channel estimator using the equalization tap gain calculated by the equalization controller.

17 Claims, 12 Drawing Sheets

CHANNEL ESTIMATION METHOD AND APPARATUS FOR WIRELESS COMMUNICATION SYSTEM

PRIORITY

This application claims the benefit under 35 U.S.C. §119 (a) of a Korean patent application filed in the Korean Intellectual Property Office on Dec. 23, 2008 and assigned Serial No. 10-2008-0132214, the entire disclosure of which is hereby incorporated by reference.

BACKGROUND OF THE INVENTION

1. Field of the Invention

The present invention relates to wireless communications. More particularly, the present invention relates to a channel estimation method and apparatus using a self-tracking algorithm for improving channel estimation accuracy.

2. Description of the Related Art

With the standardization and product maturity of high speed mobile communication technologies such as Wideband Code Division Multiple Access (WCDMA) and High Speed Downlink Packet Access (HSDPA), much research has been conducted to develop equalizer-based receivers appropriate for high speed mobile communication. A core structure of the equalizer-based receiver has been introduced that includes a channel estimator and an adaptive equalizer based on the channel estimator. The channel estimator has a tap long enough to receive all the delay profiles of a signal experiencing multipath fading and the adaptive equalization algorithm uses the multi-tap channel values. In the technologies of the related art, the receiver is designed with a long tap length in consideration of the delay profiles of a multi-path channel and a channel estimator having multiple taps that alternate between active and inactive states depending on the channel condition.

The self-tracking channel estimation method of the related art estimates the channel by analyzing properties of a delay profile of a multipath reception channel and changes the positions of the taps of the channel estimator and equalizer in a unit of a fixed chip. However, since the method of the related art controls the slew at the chip rate in a fixed size chip interval, a mismatch of a peak energy position of the received signal and the tap position of the channel estimator and equalizer can cause reception energy loss.

FIGS. 1 to 3 are graphs illustrating a problematic situation in the channel estimation method of the related art.

FIG. 1 shows the channel estimator and equalizer multi-tap energy distribution when the position of a maximum peak position is substantially identical with the reference tap position, according to the related art. FIGS. 2 and 3 show the channel estimator and equalizer multi-tap energy distributions when the maximum peak position is different from the reference tap position due to an energy shift, according to the related art.

Referring to FIG. 1, when the maximum peak of the received signal is substantially identical with the tap position of the channel estimator and equalizer, there is no reception performance loss. However, referring to FIGS. 2 and 3, when the maximum peak of the received signal is different from the tap position of the channel estimator and equalizer, energy loss occurs. Such energy loss may occur when energy distribution of the multipath fading channel shifts in a resolution less than the chip rate resolution. FIG. 2 is a graph showing the result of the shift of the energy distribution of the received signal in a resolution less than the chip rate resolution, according to the related art. In this case, the chip rate slew control method of the related art decides that there is no slew, whereby the channel estimator and equalizer fail to match the maximum peak with the tap position (i.e. fail to detect the maximum peak), thereby resulting in energy loss as denoted by reference numeral 111. FIG. 3 is a graph showing the result of the shift of the energy distribution of the received signal in a resolution greater than the preset chip rate resolution, according to the related art. Since the taps of the channel estimator can operate with the slew at the chip rate in fixed chip size, the maximum peak cannot be matched with any tap when the energy distribution is shifted by as much as greater than the fixed chip size, thereby resulting in energy loss as denoted by reference numeral 113.

As described above, the channel estimation method of the related art can perform tracking to match the maximum peak of the energy distribution of the multipath fading channel with the channel estimator and equalizer taps by adjusting the tap position in a unit of the fixed size chip interval through the chip rate slew control when the energy distribution of the multipath fading channel is shifted. However, when the energy distribution of the multipath fading channel is shifted in a resolution less than the chip rate resolution, the channel estimation method of the related art fails to match the reception point of the maximum peak with the channel estimator and equalizer tap, thereby resulting in energy loss of the received signal.

SUMMARY OF THE INVENTION

An aspect of the present invention is to address at least the above-mentioned problems and/or disadvantages and to provide at least the advantages described below. Accordingly, an aspect of the present invention is to provide a variable chip rate fast self-tracking method for designing a receiver based on the channel estimator and equalizer appropriate for a mobile communication environment by a time-varying multipath fading property by avoiding the performance degradation caused by a mismatch between the maximum peak position and the channel estimator and equalizer tap and a path energy prediction and a slew control apparatus based on a path energy prediction.

Another aspect of the present invention is to provide a channel estimation method and apparatus that is capable of avoiding the performance degradation caused by the mismatch between the maximum peak position of the received signal and the reference position of the channel estimator and the equalizer tap.

Yet another aspect of the present invention is to provide a channel estimation method and apparatus that is capable of improving channel estimation performance of a mobile terminal using a novel variable chip rate fast self-tracking and path energy prediction algorithm.

Still another aspect of the present invention is to provide a channel estimation method and apparatus that is capable of improving reception performance of a terminal in a multipath fading channel environment.

Yet another aspect of the present invention is to provide a channel estimation method and apparatus that is capable of improving reception performance of a mobile terminal, especially in a high speed data communication system such as Wideband Code Division Multiple Access (WCDMA) and High Speed Downlink Packet Access (HSDPA).

In accordance with an aspect of the present invention, a channel estimation apparatus of a mobile terminal is provided. The method includes a receiver for converting a received radio signal into a baseband signal, a match filter for converting the baseband signal into a digital signal including at least two samples, a channel estimator for buffering the samples, for analyzing multipath signals to predict a maximum power position and multipath energy, and for estimating a channel by selecting a multi-tap at the maximum energy position through a slew control, an equalization controller for calculating an equalization tap gain using the multi-tap selected by the channel estimator, and an equalizer for compensating for distortion in the samples output by the channel estimator using the equalization tap gain calculated by the equalization controller.

Preferably, the channel estimator includes a slew buffer/sampler including a slew buffer and an on/late sampler supporting at least an 8× sample rate and outputting on/late samples of corresponding taps according to a slew control signal, a Pseudo Noise (PN) sequence generator for generating a PN sequence; a multi-tap subchannel estimator for performing a parallel channel estimation to the multiple taps using the on/late samples and PN sequence and for outputting channel estimation values to the equalization controller according to a multi-tap lock control signal, a channel estimation controller for analyzing a delay profile, for predicting multipath energy based on the channel estimation values output by the multi-tap subchannel estimator to select a slew control value, for providing the slew control signal containing the slew control value to the slew buffer/sampler, and for providing the multi-tap lock control signal to the multi-tap subchannel estimator and the PN code generator, and a chip buffer for buffering the on/late samples and for outputting the on/late samples to the equalizer.

Preferably, the channel estimation controller includes a delay profile analyzer for analyzing the delay profile of the multipath fading channel to determine the maximum power position, a path energy predictor for predicting a shift of multi-tap energy by observing energy distribution of the multipath fading channel, and a slew controller for determining a chip rate between a reference position tap and the maximum power position based on the output of the delay profile analyzer and the path energy predictor.

In accordance with another aspect of the present invention, a channel estimation method of a mobile terminal is provided. The method includes converting a received radio signal into a digital signal having at least 8 samples in a chip duration, estimating a channel by buffering the samples, predicting a maximum power position and predicting multipath energy through multipath channel signal analysis, selecting a multi-tap at a maximum energy position by slew control according to the maximum power position and the multipath energy, controlling equalization for calculating an equalization tap gain using the channel-estimated multi-tap, and compensating for a distortion in the samples output as a result of the channel estimation using the equalization tap gain.

Preferably, the estimating of the channel includes buffering on and late samples separately, performing parallel channel estimation on the multiple taps using the on and late samples and a Pseudo Noise (PN) sequence, selecting a slew control value by analyzing a delay profile and predicting multipath energy from the multi-tap channel estimation values, and outputting the sample selected by the slew control and multi-tap channel estimation values.

Preferably, the estimating of the channel includes determining a maximum power position by analyzing the delay profile of the multipath channel, predicting a shift of multi-tap energy by observing energy distribution of the multipath fading channel, selecting a chip rate between a reference position tap and the maximum power position based on the result of delay profile analysis and the path energy prediction, and generating a slew control signal of the selected chip rate.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention propose a signal reception apparatus and method using a fast self-tracking channel estimator for a wireless communication system. Exemplary embodiments of the present invention propose the receiver structure for a wireless communication system supporting a high data rate such as Wideband Code Division Multiple Access (WCDMA) and High Speed Downlink Packet Access (HSDPA). Exemplary embodiments of the present invention propose a self-tracking channel estimation apparatus and method that is capable of adjusting the tap position of the channel estimator and equalizer in adaptation to the change of the delay profile of a multipath signal, especially with high mobility of the terminal and geographical obstacles, thereby improving reception performance.

In an exemplary embodiment of the present invention, a signal reception apparatus includes a fast self-tracking-based channel estimator and equalizer, and the channel estimator includes a path energy predictor and a slew controller and adjusts the tap position of the channel estimator and equalizer in adaptation to the change of the delay profile of a multipath reception signal.

The slew decision is made by comparing the maximum value of a moving average and a reference position in a fast self-tracking process and comparing a predict metric and a threshold value in a path energy prediction process. The slew control is performed by adjusting input/output sampling position of a slew buffer and an on-late sampler.

Figure 1:
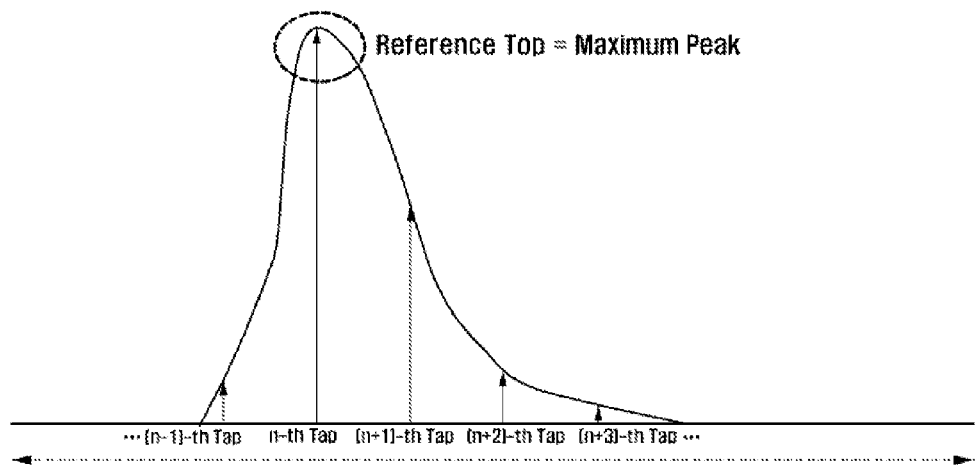
FIGS. 1 to 3 are graphs illustrating a problematic situation in a channel estimation method according to the related art.
Figure 2:
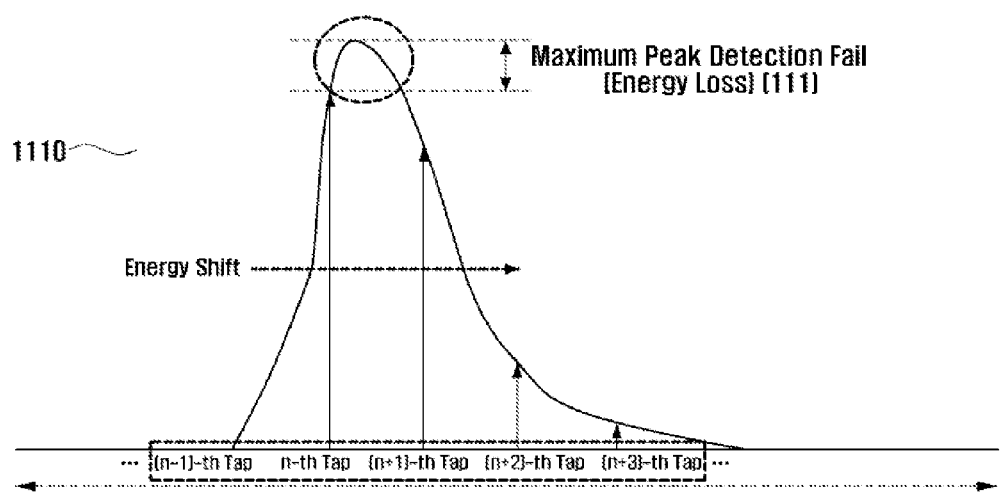
Figure 3:
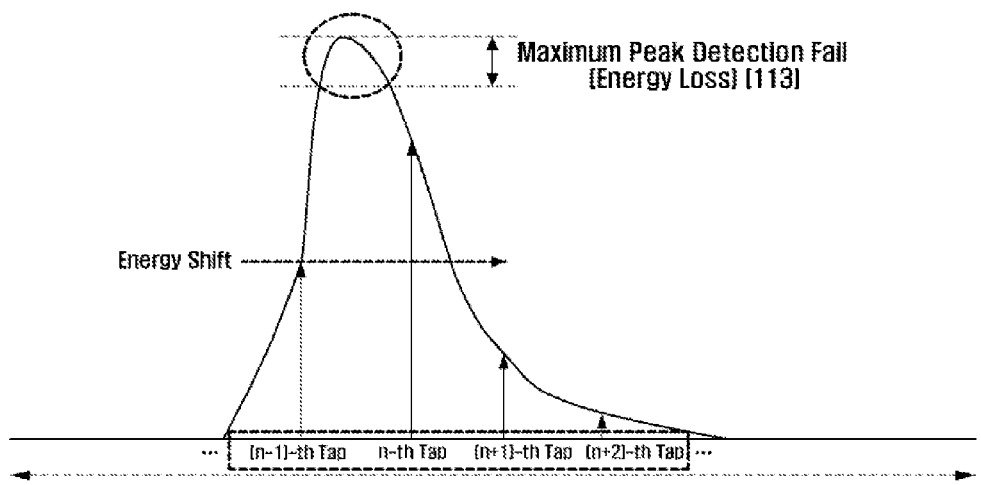
Figure 4:
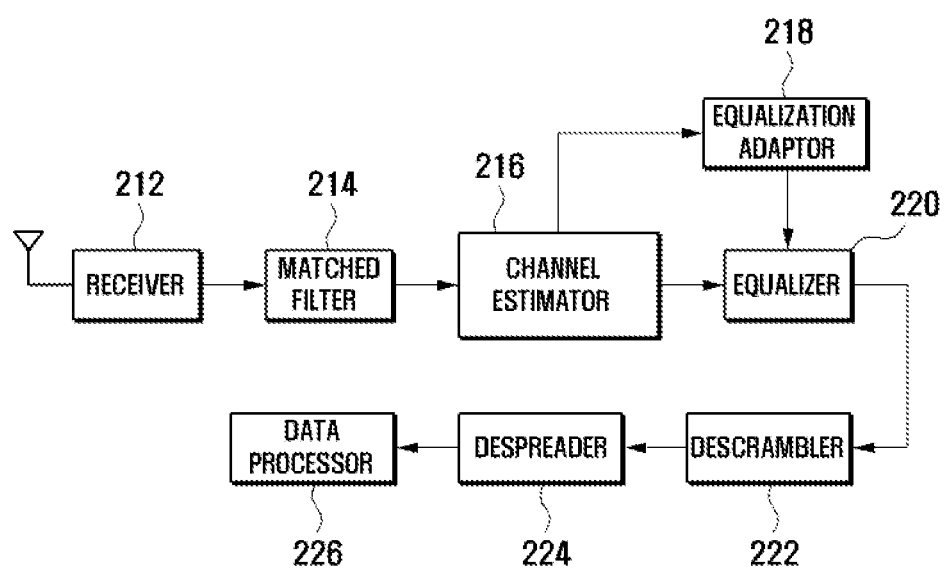
FIG. 4 is a block diagram illustrating a configuration of a mobile terminal using a self-tracking channel estimator and an equalizer according to an exemplary embodiment of the present invention.

FIG. 4 is a block diagram illustrating a configuration of a mobile terminal using a self-tracking channel estimator and an equalizer according to an exemplary embodiment of the present invention.

Referring to FIG. 4, the mobile terminal includes a receiver 212, a matched filter 214, a channel estimator 216, an equalization adaptor 218, an equalizer 220, a descrambler 222, a despreader 224, and a data processor 226.

The receiver 212 down-converts the radio signal received through an antenna into a baseband signal. The matched filter 214 performs match filtering on the signal output by the receiver 212 by using a reference signal. The channel estimator 216 performs despreading on the signal using a known sequence (e.g. pilot signal) and estimates the channel using the correlation between the despread signal and the original signal. In an exemplary embodiment of the present invention, the channel estimator 216 is a self-tracking channel estimator that is capable of estimating multiple tabs at the positions for the signal received through the multipath fading channels. The equalizer adaptor 218 generates filter coefficients to be used for the equalization of the channel estimation result of the channel estimator 216. The equalizer (Finite Impulse Response (FIR) filter) 220 performs equalization on the output signal of the channel estimator 216 to compensate the distortion of the signal received through the multipath fading channel. The descrambler 222 performs descrambling on the output of the equalizer, the despreader 224 performs descrambling on the output of the descrambler 222, and the data processor 226 performs demodulation and decoding on the despreaded signal.

The radio signal received by the antenna is converted into a digital signal through the receiver 212 and the matched filter 214. That is, the received radio signal is down-converted into a baseband signal through the receiver 212, and the base band signal is converted into the digital signal through the matched filter 214. The channel estimator 216 performs self-tracking on the digital signal output by the matched filter 214 to generate a channel estimation value with the sample signal having a maximum energy peak while slewing according the energy shift caused in the corresponding chip duration. The equalization adaptor 218 determines the filter coefficient of the equalizer 220 with the output of the channel estimator 218 such that the equalizer 220 performs equalization on the output of the channel estimator 216 with the coefficient output by the equalization adaptor 218. At this time, the maximum energy reception point is matched with the tap position of the channel estimator 216 and the equalizer 220 to minimize the energy loss of the received signal, whereby the mobile terminal can receive the signal through the multipath fading channels. An exemplary implementation of the channel estimator 216 is described below with reference to FIG. 5.

Figure 5:
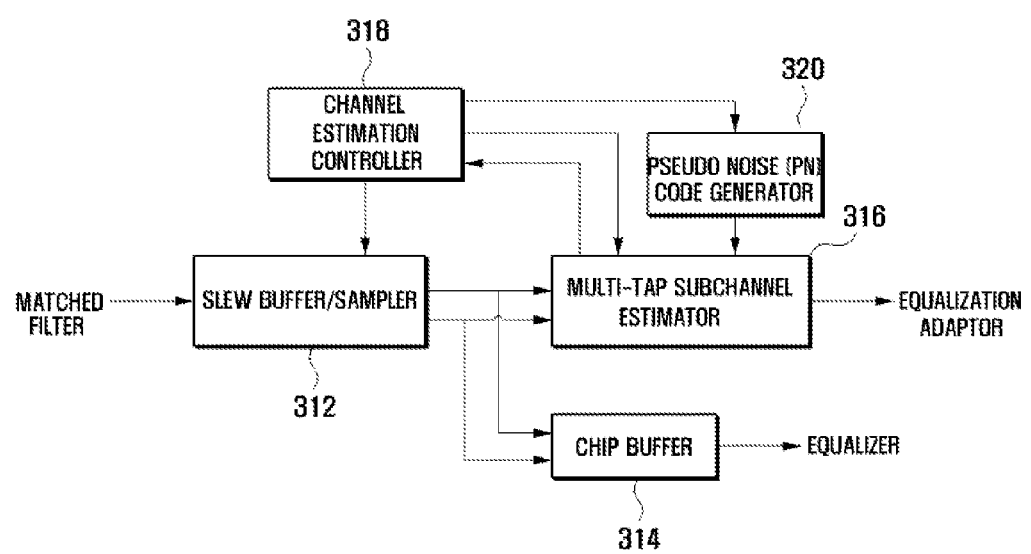
FIG. 5 is a block diagram illustrating a configuration of a channel estimator according to an exemplary embodiment of the present invention.

FIG. 5 is a block diagram illustrating a configuration of a channel estimator according to an exemplary embodiment of the present invention.

Referring to FIG. 5, the channel estimator includes a slew buffer/sampler (chip rate slew buffer and on-late sampler) 312, a chip buffer 314, a multi-tap subchannel estimator 316, a channel estimation controller 318, and a Pseudo Noise (PN) code generator 320.

The slew buffer/sampler 312 buffers the sampling signal, such as a sampling signal output by the matched filter 214 of FIG. 4, at the chip rate of X and performs slew control on the sampling signal under the control of the channel estimator controller 318 to generate the on-sample and-late sample. In an exemplary embodiment of the present invention X is 8.

The multi-tap subchannel estimator 316 performs channel estimation with N consecutive taps arranged at a half chip interval in parallel. That is, the multi-tap subchannel estimator 316 includes a plurality of subchannel estimators and obtains the channel estimation values from the multiple taps using the on and late samples and PN sequence. There may be as many subchannel estimators as there are a number of multiple taps. At this time, the on-sample is input to the odd numbered subchannel estimators (or even numbered subchannel estimators), and the late-sample is input to the even numbered subchannel estimators (or odd numbered subchannel estimators). The multi-tab subchannel estimator 316 is provided with a plurality of delay buffers that delay the PN sequence output by the PN sequence generator 320 at a preset chip interval and then output the delayed PN sequences to the individual subchannel estimators. The delay buffers delay the PN sequence by as much as N/2−1 chips such that the PN sequence is input with the delay of 1 chip across two subchannel estimators.

The multi-tap subchannel estimator 316 obtains the channel estimation values of the total N taps arranged at the half chip interval using the N subchannel estimators and outputs the channel estimation values to the channel estimation controller 318. The multi-tap subchannel estimator 316 performs lock and unlock control based on the lock information output by the channel estimation controller 318 to supply the channel estimator values to the channel estimation controller 318.

The chip buffer 314 buffers the on-samples and late-samples output by the slew buffer/sampler 312 in sequential order and outputs the buffered on-samples and late samples to the equalizer 220 at the time point when the filter coefficient for controlling the tap gain of the equalizer 220 is applied. Here, the chip buffer is a First Input First Output (FIFO) buffer which buffers the data signal and supplies the data signal of the on/late-samples to the equalizer simultaneously with the equalization tap gain of the equalization adaptor 218.

The channel estimation controller 318 analyzes the channel characteristics based on the estimated channel values output by the multi-tap subchannel estimator 316 and controls the operations of the multi-tap energy calculation, multi-tap lock control, Doppler estimation, delay profile analysis, path energy prediction, and slewing control.

The channel estimation controller 318 measures the time average powers of the multi-tap channels continuously, calculates the sum of the time average powers of the individual taps, calculates a lock threshold based on the sum of the time average powers, determines whether to lock or unlock the respective taps based on the lock threshold, and supplies the determination result to the multi-tap subchannel estimator 316. The channel estimation controller 318 also calculates a time correlation of the multi-tap channels, estimates the mobility of the mobile terminal based on the time correlation, and generates a parameter for determining the filter coefficients of the respective subchannel estimators of the multi-tap subchannel estimator 316 and the convergence speed of the of the equalizer 220. The channel estimation controller 318 also analyzes the multipath characteristics of the reception channel using the estimated multi-tap channel values in the form of energy distribution and delay spread to determine the maximum power position and predicts the shift of the multi-tap energy by observing the energy distribution of the multipath fading channel. The channel estimation controller 318 also compares the maximum power position determined based on shift of the predicted multi-tap energy shift with the preset positions of the taps (i.e., reference position) to determine whether any slew has occurred.

The PN sequence generator 320 generates a PN sequence including a scrambling code for despreading, an Orthogonal Variable Spreading Factor (OVSF) code, and an antenna pattern and outputs the PN sequence for the multi-tap subchannel estimator 316 to recover the pilot signal. More particularly, in an exemplary embodiment of the present invention, the PN sequence generator 320 controls the output of the PN sequence according to the slewing signal output by the channel estimation controller 318. That is, the PN sequence generator 320 outputs the PN sequence at the position identical with the sample having the maximum energy that is slewed by the channel estimation controller 318.

If the delay profile of the signal received through the multipath fading channel is changed due to the fast movement of the mobile terminal or geographical obstacles, various types of energy shifts can occur in the received signal. Accordingly, it is preferred that a plurality of samples are taken within a chip duration for detecting the fine energy shifts of the received signal. In the following description, it is assumed that the sampling rate of 8 (X=8) is used.

Accordingly, in the channel estimator of FIG. 5, the slew buffer/sampler 312 is provided with an 8× chip rate slew buffer and an on-late sampler, and the channel estimation controller 318 predicts the shift of the multi-tap energy by observing the energy distribution of the multipath fading channel, analyzes the multipath characteristics of the received channel in the form of an energy distribution and delay spread to determine the maximum power position having the maximum power value, and compares the maximum power position and the preset multi-tap position (i.e. reference position) to determine whether a slewing has occurred. In an exemplary embodiment of the present invention, the slew control can be performed at the 2×, 4×, and 8× chip rates, whereby the tap position of the channel estimator and equalizer can be adjusted in a resolution of ½, ¼, and ⅛ chip duration. An exemplary implementation of the channel estimation controller 318 is described below with reference to FIG. 6.

Figure 6:
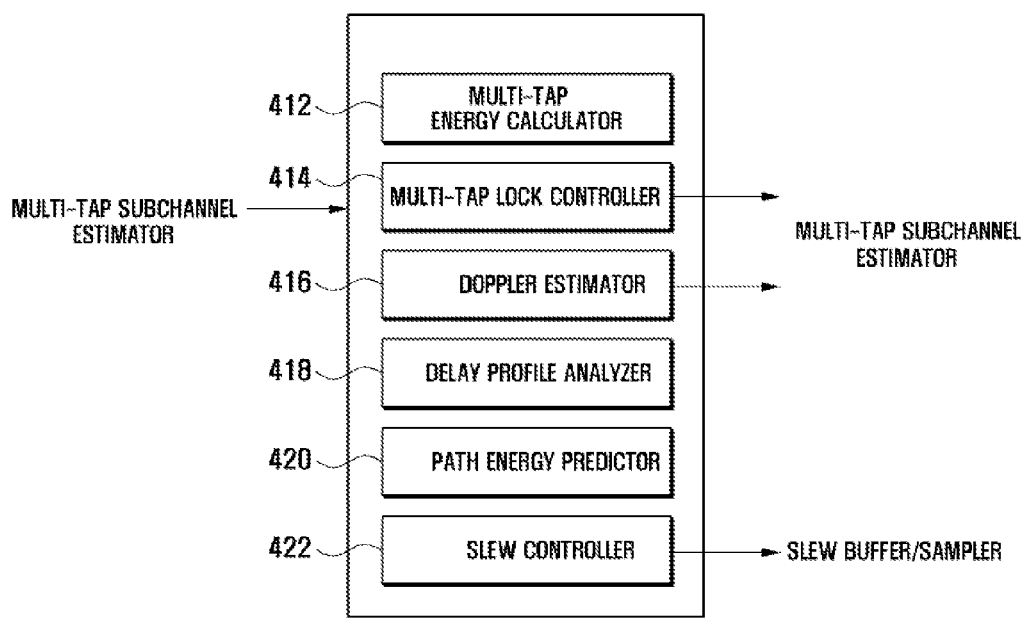
FIG. 6 is a block diagram illustrating a configuration of a channel estimation controller according to an exemplary embodiment of the present invention.

FIG. 6 is a block diagram illustrating a configuration of a channel estimation controller according to an exemplary embodiment of the present invention.

Referring to FIG. 6, the channel estimation controller includes a multi-tap energy calculator 412, a multi-tap lock controller 414, a Doppler estimator 416, a delay profile analyzer 418, a path energy predictor 420, and a slew controller 422.

The multi-tap energy calculator 412 measures the time average power continuously and outputs the measured time average power to the multi-tap lock controller 414. Here, the time average power of the multi-tap channel is calculated using Equation (1):

$$P_n(t) = \frac{1}{N_\tau} \sum_{\tau=t-N_\tau+1}^{t} |h_n(t)|^2 \qquad \text{Equation (1)}$$

where $p_n(t)$ denotes the time average power of an $n^{th}$ channel tap, $h_n(t)$ is the channel estimation value of the $n^{th}$ channel tap at time t, N denotes a number of taps of a multi-tap subchannel estimator, such as the multi-tap subchannel estimator 316 of FIG. 5, and $N_\tau$ denotes a window size for calculating the time average power. By increasing the window size, long-term power control is possible. Also, by decreasing the window size, short-term power control is possible. For instance, if the window size is set to '1', only the instantaneous power is used for the power control.

The multi-tap lock controller 414 calculates the sum of the time average power values of the individual channels using Equation (2) and calculates the lock threshold using the sum of the time average power values using Equation (3). The sum of power values at time t is calculated by using Equation (2):

$$P_{tot}(t) = \sum_{n=1}^{N} P_n(t) \qquad \text{Equation (2)}$$

where $P_{tot}(t)$ denotes the sum of the time average powers at time t, and $P_n(t)$ denotes the time average power value at the $n^{th}$ channel tap.

The lock threshold value is calculated by using equation (3):

$$T_L = P_{tot}(t)/T_\alpha \qquad \text{Equation (3)}$$

where $T_L$ denotes the lock threshold value, $P_{tot}(t)$ denotes the sum of the time average power at time t, and $T_\alpha$ denotes the lock threshold value coefficient. The lock threshold value coefficient $T_\alpha$ is set to a different value depending on the Signal to Interference and Noise Ration (SINR). That is, since the estimation value of the subchannel estimator is relatively accurate in the high SINR environment, it is preferred to lock as many of the taps as possible by using the small lock threshold value. In contrast, since the estimation value of the subchannel estimator contains a relatively high amount of noise, it is preferred to unlock as many of the taps as possible by increasing the lock threshold value.

Next, the multi-tap lock controller 414 determines whether to lock or unlock of the individual taps using Equation (4) and outputs the determination result to the multi-tap subchannel estimator. Whether to lock or unlock the individual taps is determined using Equation (4):

$$Lock_n = \begin{cases} 1, & \text{if } P_n(t) > T_L \\ 0, & \text{otherwise} \end{cases} \quad \text{Equation (4)}$$

where '1' denotes that the corresponding tap is locked, and '0' denotes that the corresponding tap is unlocked.

The Doppler estimator 416 calculates the time correlation of the multi-tap channel, estimates the mobility of the mobile terminal based on the time correlation to generate the filter coefficients of the individual subchannel estimators of the multi-tap subchannel estimator and the parameter for determining the convergence speed of the equalizer, and outputs the parameter to the multi-tap subchannel estimator.

The delay profile analyzer 418 analyzes the multipath channel characteristics of the received channel in the form of the energy distribution and delay spread and determines the maximum power position having the maximum power value. At this time, the delay profile analyzer 418 analyzes the delay profile of the multipath channel using the moving average algorithm represented by Equation (5):

$$MA_n(t) = \frac{1}{N_{MA}} \sum_{i=n}^{n+N_{MA}-1} P_n(t) \quad \text{Equation (5)}$$

where $MA_n(t)$ denotes the moving average of an $n^{th}$ channel tap at time t, $N_{MA}$ denotes a moving average window size of an $n^{th}$ channel tap at time t and can be set to a value less than the number of channel taps N (n=1, 2, 3, ..., N), and $P_n(t)$ is a time average power obtained through the time averaging of an $n^{th}$ channel tap at time t. The delay profile analyzer 418 determines the maximum power position using equation (6):

$$n_{max}(t) = \operatorname*{argmax}_{n} MA_n(t) \quad \text{Equation (6)}$$

where $n_{MAX}(t)$ denotes the maximum power position.

The path energy predictor 420 calculates a predict metric for path prediction when the maximum energy position matches with the reference position. The prediction metric can be obtained using calculated DELTA_PRE and DELTA_POST values. The path energy predictor 420 calculates the DELTA_PRE using Equation (7) and the DELTA_POST using Equation (8).

$$DELTA\_PRE(t) = MA_{ref}(t) - MA_{(ref-1)}(t) \quad \text{Equation (7)}$$

The DELTA_PRE can be obtained as the difference between the moving average power at the reference position and the moving average power at the tap preceding right before the reference position. The DELTA_POST of can be obtained as the difference between the moving average power at the reference position and the moving average power at the tap following right after the reference position.

$$DELTA\_POST(t) = MA_{ref}(t) - MA_{(ref-1)}(t) \quad \text{Equation (8)}$$

The DELTA_PRE and DELTA_POST are calculated using Equations (7) and (8) respectively, and the predict metric is calculated by using Equation (9) with the DELTA_PRE and DELTA_POST.

$$PREDICT\_METRIC = \frac{DELTA\_PRE}{DELTA\_POST} \quad \text{Equation (9)}$$

The DELTA_PRE obtained by using Equation (7) is the difference between the reception energies at the reference position tap and the tap distant from the reference position as much as ½ chip right before the reference position tap, the DELTA_POST is the difference between the reception energies at the reference position tap and the tap distant from the reference position as much as ½ chip right after the reference position tap, and the predict metric is calculated as a ratio of the DELTA_PRE to the DELTA_POST.

The slew controller 422 is responsible for controlling a slew buffer/on-late sampler, such as the slew buffer/on-late sampler 312 of FIG. 5, according to the results of the delay profile analyzer 418 and the path energy predictor 420. The slew controller 422 compares the maximum power position output by the delay profile analyzer 418 and the reference position and determines the chip rate slewing in a negative or positive direction according to the difference between the maximum power position and the reference position. When the maximum power position and the reference position are identical with each other, the slew controller 422 can determine a fine amount of slewing in the negative or positive direction.

The slew controller 422 compares the predict metric with a negative threshold and, if the predict metric is less than the negative threshold, performs a negative slew control. The slew controller 422 also compares the predict metric with a positive threshold and, if the predict metric is greater than the positive threshold, performs a positive slew control. The slew control decision of the slew controller 422 is made using Equation (10):

$$Slew = \begin{cases} -1, & \text{if } PREDICT\_METRIC < NEGATIVE\_THRESHOLD \\ 1, & \text{if } PREDICT\_METRIC > POSITIVE\_THRESHOLD \\ 0, & \text{otherwise} \end{cases} \quad \text{Equation (10)}$$

where '−1' denotes negative slew control, '1' denotes positive slew control, and '0' denotes no slew control.

As described above, the slew controller 422 analyzes the outputs of the delay profile analyzer 418 and the path energy predictor 420 and makes a slew control decision based on the analysis result. When the maximum power position and the reference position are not identical with each other, i.e., if the multipath delay profile is shifted as time progresses to mismatch with the multi-tap position, the slew controller 422 generates a slew control signal to shift the maximum power position to a forward or backward tap to match with the reference position.

The slew controller 422 controls the slew buffer/sampler and a PN sequence generator, such as PN sequence generator 320 of FIG. 5, by generating the slew control signal such that the multipath delay profile is distributed within the range of the multi-tap. Here, the slewing can be one of a negative slewing and a positive slewing. The negative slewing amplifies the phase of the PN sequence so as to match with the phase of the received signal, and the positive slewing deamplifies the phase of the code so to match with the phase of the received signal.

The above structured channel estimation controller receives the channel values estimated by the multi-tap subchannel estimator and controls the channel estimation and equalization operation based on the channel characteristic analysis based on the channel values. The multi-tap energy calculator (or analyzer) 412 of the channel estimation controller measures the time-averaged powers of the multi-tap channels continuously. The multi-tap lock controller 414 calculates the lock threshold using the time-averaged power values of the multi-tap channels, determines whether to lock or unlock the respective taps, and outputs the determination result to the multi-tap subchannel estimator. The Doppler estimator 416 calculates the time correlations of the multi-tap channels and estimates mobility of the mobile terminal based on the time correlations of the multi-tap channels. The result of the Doppler estimation is provided to the multi-tap subchannel estimator so as to be used as a parameter for determining the filter coefficient and the convergence speed of the equalizer.

The delay profile analyzer 418 analyzes the multipath characteristics of the received signal using the estimated multi-tap channel values. In an exemplary embodiment of the present invention, the delay profile analyzer 418 analyzes the multipath characteristic of the received signal in the form of energy distribution and delay spread and compares the maximum power position of the energy distribution with the multi-tap position. The path energy predictor 420 monitors the energy distribution of the multi-path fading channel and predicts the shift of the multi-tap energy. The energy distribution prediction result is used for X times chip rate slew control (in an exemplary embodiment of the present invention, X=8) and low resolution slew control. The slew controller 422 controls the slew buffer/sampler according to the outputs of the delay profile analyzer 412 and the path energy predictor 420.

The key operation principle of the self-tracking algorithm of an exemplary embodiment of the present invention is to match the maximum energy position with the tap position of the equalizer precisely in a unit of 1/X chip (X is a number of samples and 8 sample signals (X=8) are generated in a single chip duration) as well as to control such that the multipath reception energy is appropriately distributed around the center within the range of the multiple taps, using the multipath delay profile analysis and the path energy prediction. In this manner, the mobile terminal can reduce the performance degradation caused by the mismatch between the maximum energy position and the tap position and secure superior reception performance even in various types of multipath fading channel environments.

Figure 7:
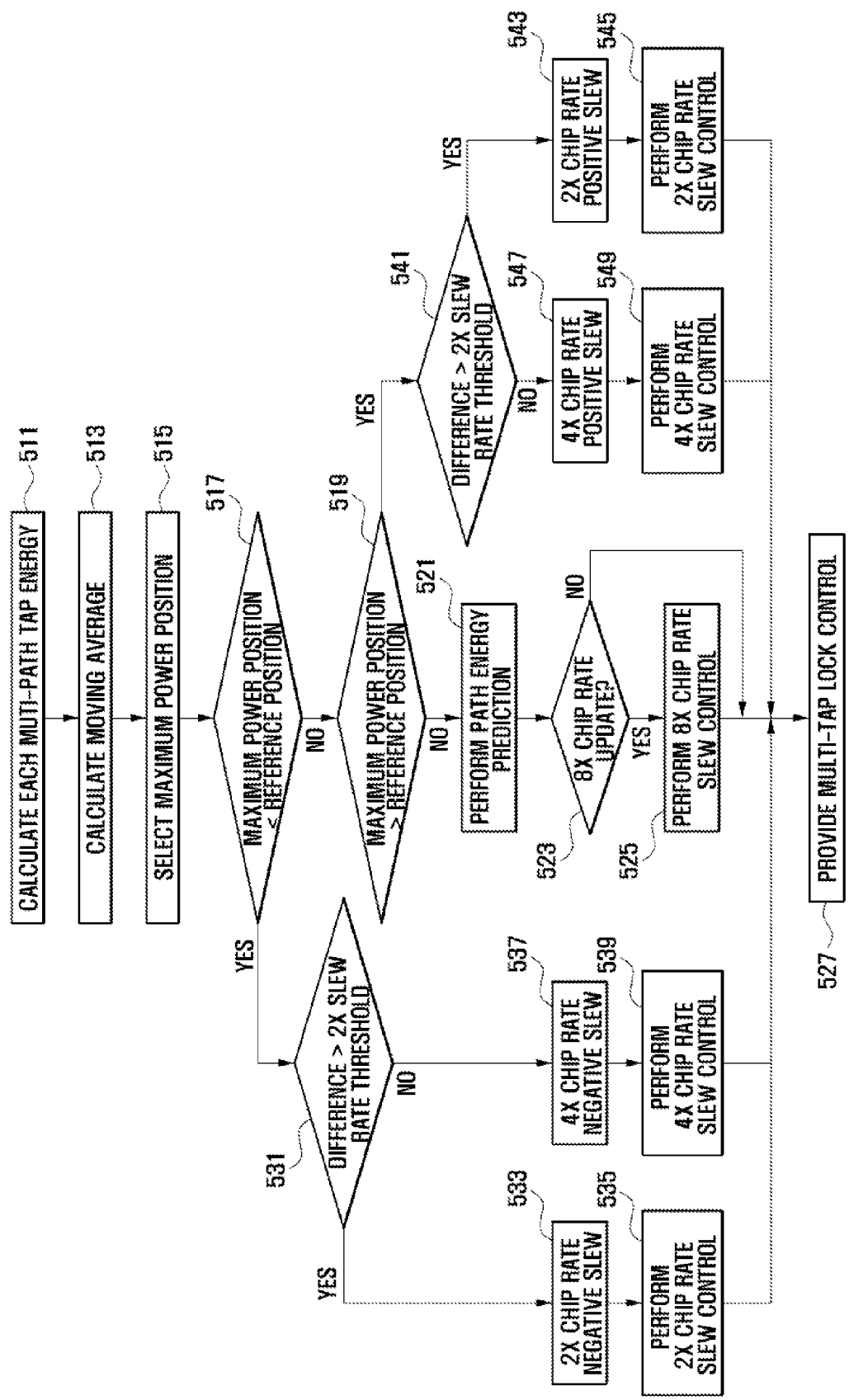
FIG. 7 is a flowchart illustrating a slewing decision procedure of a channel estimation method according to an exemplary embodiment of the present invention.

FIG. 7 is a flowchart illustrating a slewing decision procedure of a channel estimation method according to an exemplary embodiment of the present invention. In the exemplary embodiment of FIG. 7, it is assumed that the mobile terminal is equipped with an 8× chip rate self-tracking channel estimator and an equalizer performs the self-tracking control through delay profile analysis and slew control.

Referring to FIG. 7, a channel estimation controller, such as the channel estimation controller 318 of FIG. 5, calculates each multi-path tap energy in step 511 and calculates a moving average using the multi-path tap energy in step 513. The moving average can be obtained by analyzing the multipath delay profile. That is, the analyzed multipath delay profile is compared with the preset position of the multi-tap and, if the multipath delay profile is not centered in association with the multi-tap, the slew control is performed. The channel estimation controller measures the time-averaged power and calculates the moving average based on the measured time-averaged power. The moving average of the $n^{th}$ channel tap at time t is calculated using Equation (5). Next, the channel estimation controller selects the maximum power position using Equation (6) in step 515.

Once the maximum power position is selected, the channel estimation controller determines whether the maximum power position is less than the reference position in step 517. The reference position is the multi-tap to which the peak position of the energy distribution of the delay profile of the system should be matched. That is, the self-tracking is a method for adjusting the maximum power position shifted forward or backward from the reference point so as to maintain the match between the maximum power position and the reference point by performing the slew control.

If it is determined that the maximum power position is less than the reference position at step 517, the channel estimation controller determines whether the difference between the maximum power position and the reference position is greater than a 2× slew rate threshold in step 531. If the difference is greater than the 2× slew rate at step 531, the channel estimation controller selects a 2× chip rate negative slew in step 533, controls a slew buffer/sampler, such as the slew buffer/sampler 312, to perform 2× chip rate slew control in step 535, and provides a corresponding multi-tap lock control signal to a multi-tap subchannel estimator, such as the multi-tap subchannel estimator 316 of FIG. 5, in step 527. If the difference is not greater than the 2× slew rate threshold at step 531, the channel estimation controller selects a 4× chip rate negative slew in step 537, controls the slew buffer to perform 4× chip rate slew control in step 539, and provides a corresponding multi-tap lock control signal to the multi-tap subchannel estimator in step 527.

If it is determined that the maximum power position is not less than the reference position at step 517, the channel estimation controller determines whether the maximum power position is greater than the reference position in step 519. If it is determined that the maximum power position is greater than the reference position at step 519, the channel estimation controller determines whether the difference between the maximum power position and the reference position is greater than a 2× slew rate threshold in step 541. If the difference is greater than the 2× slew rate threshold at step 541, the channel estimation controller selects the 2× slew rate positive threshold in step 543, controls the slew buffer/sampler to perform the 2× chip rate slew control in step 545, and provides a corresponding multi-tap lock control signal to the multi-tap subchannel estimator in step 527. If the difference is not greater than the 2× slew rate threshold at step 541, the channel estimation controller selects a 4× slew rate positive threshold in step 547, controls the slew buffer/sampler to perform the 2× chip rate slew control in step 549, and provides a corresponding multi-tap lock control signal to the multi-tap subchannel estimator in step 527.

If it is determined that the maximum power position is not less than the reference position (i.e. the maximum power position is equal to the reference position) at step 519, the channel estimation controller observes the energy distribution of the multipath fading channel and performs a path energy prediction in step 521. The result of the energy distribution prediction of the multipath fading channel can be used for a slew control in low resolution such as 8× chip rate slew control. Next, the channel estimation controller determines whether an 8× chip update is needed in step 523. If it is determined that the 8× chip update is needed at step 523, the channel estimation controller controls the slew buffer/sampler to perform the 8× chip rate slew control in step 525 and provides a corresponding multi-tap lock control signal to the multi-tap subchannel estimator. Otherwise, if it is determined that the 8× chip rate update is not required at step 523, the channel estimation controller skips step 525 and provides the corresponding multi-tap lock control signal to the multi-tap subchannel estimator.

As described above, the channel estimation controller controls to perform the 2× chip rate negative slew or the 4× chip rate negative slew according to the difference between the maximum power position and the reference position when the maximum power position is less than the reference position and the 2× chip rate positive slew or the 4× chip rate positive slew according to the difference between the maximum power position and the reference position when the maximum power position is greater than the reference position, thereby securing estimation accuracy in chip rate resolution. Also, the channel estimation controller can use the 8× chip rate slew buffer even though the multi-tap of a channel estimator, such as the channel estimator 216 of FIG. 4, and an equalizer, such as the equalizer 220 of FIG. 4, are designed at a ½ chip interval, thereby being able to perform ½, ¼, and ⅛ chip rate resolution. That is, the channel estimation controller predicts the path energy when the maximum energy position matches with the reference position and performs the 8× chip rate slew control according to the prediction result. After the 2×, 4×, and 8× chip rate slew control, the channel estimation controller performs the multi-tap lock control.

Figure 8:
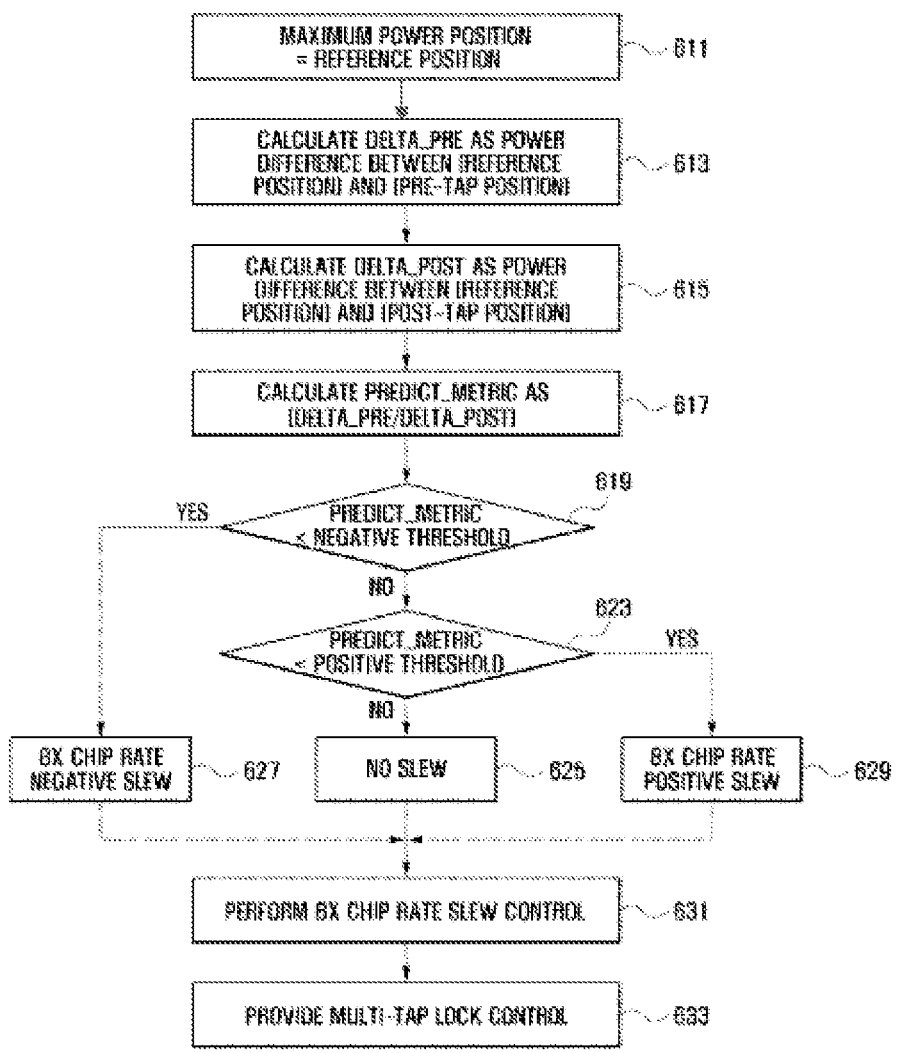
FIG. 8 is a flowchart illustrating a path energy prediction-based 8× chip rate slew control procedure of a channel estimation method according to an exemplary embodiment of the present invention.

FIG. 8 is a flowchart illustrating a path energy prediction-based 8× chip rate slew control procedure of a channel estimation method according to an exemplary embodiment of the present invention. The path energy prediction-based 8× chip slew control procedure of FIG. 8 may correspond to steps 521 to 525 of FIG. 7.

Referring to FIG. 8, if the maximum power position is equal to a reference position, a channel estimation controller, such as the channel estimation controller 318 of FIG. 5, detects the equality of the two positions in step 611 and calculates a predict metric for path prediction through steps 613 to 617. The channel estimation controller calculates DELTA_PRE as the power difference between the reference position and the pre-tap position using Equation (7) in step 613 and calculates DELTA_POST as the power difference between the reference position and the post-tap position in step 615. The DELTA_PRE can be calculated as the difference between the moving average power at the reference position and the moving power at the tap preceding right before the reference position, and the DELTA_POST can be calculated as the difference between the moving average power at the reference position and the moving power at the tap following right after the reference position.

After the calculation of the DELTA_PRE and the DELTA_POST, the channel estimation controller calculates the predict metric using Equation (9) in step 617. The predict metric can be expressed as a ratio of the DELTA_PRE and the DELTA_POST. The DELTA_PRE is the reception energy difference between the reference position tap and a position distant by as much as ½ chip from the reference position in a backward direction, and the DELTA_POST is the reception energy difference between the reference position tap and a position distant by as much as ½ chip from the reference position in a forward direction.

Next, the channel estimation controller determines a slew control by comparing the predict metric and negative and positive thresholds. In more detail, the channel estimation controller determines whether the predict metric is less than the negative threshold in step 619. If the predict metric is less than the negative threshold at step 619, the channel estimation controller selects the 8× chip rate negative slew in step 627. Here, the negative threshold is a value selected in the range between '0' and '1'. If the predict metric is not less than the negative threshold at step 619, the channel estimation controller determines whether the predict metric is less than the positive threshold in step 623. If the predict metric is greater than the positive threshold at step 623, the channel estimation controller selects the 8× chip rate positive slew in step 629. Here, the positive threshold can be a real number greater than '1'. Otherwise, if the predict metric is not greater than the positive threshold (i.e. if the predict metric is not less than the negative threshold and not greater than the positive threshold), a channel estimation controller, such as the channel estimation controller 310 of FIG. 5, selects no slew control in step 625. Once the slew control is selected through steps 619 to 629, the channel estimation controller controls a slew buffer/sampler, such as the slew buffer/sampler 312 of FIG. 5, to perform the selected slew control in step 631 and provides the corresponding multi-tap lock control signal to a multi-tap subchannel estimator, such as the multi-tap subchannel estimator 316 of FIG. 5, in step 633.

Figure 9:
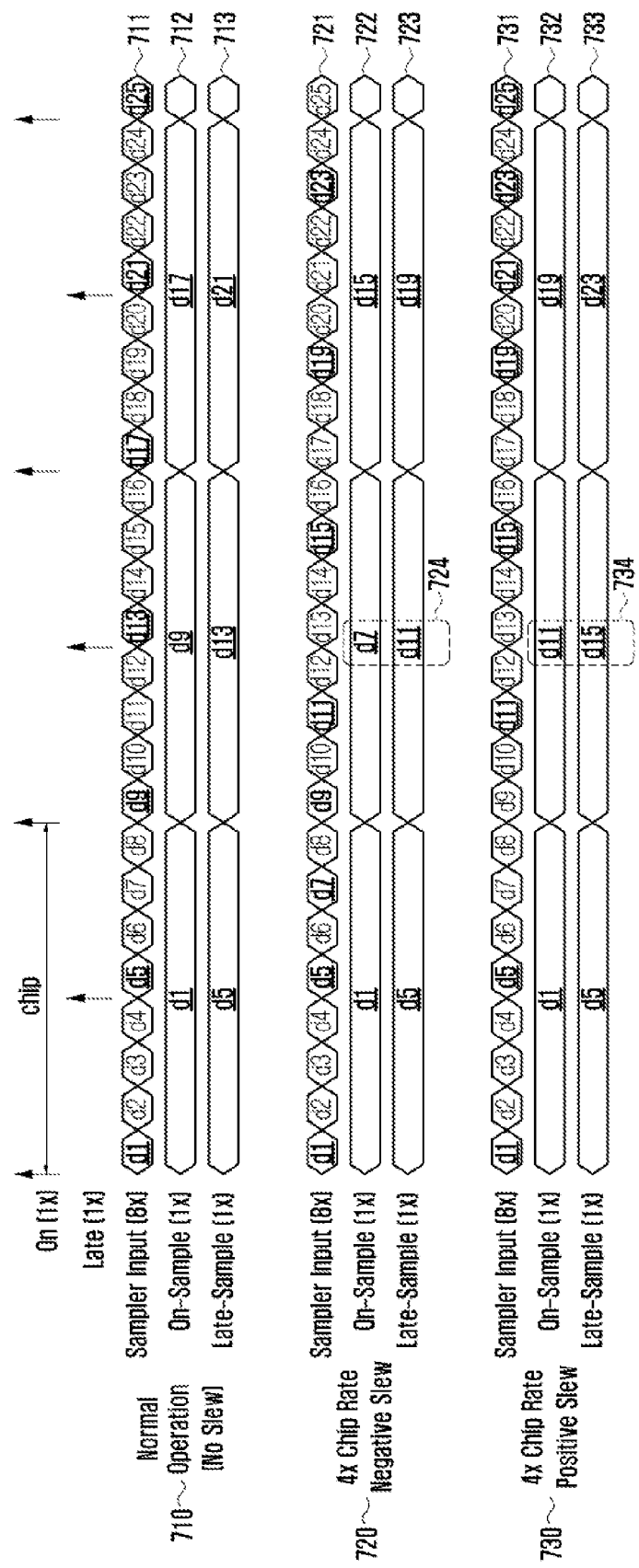
FIGS. 9 and 10 are diagrams illustrating a slew control operation of a channel estimation apparatus according to an exemplary embodiment of the present invention.
Figure 10:
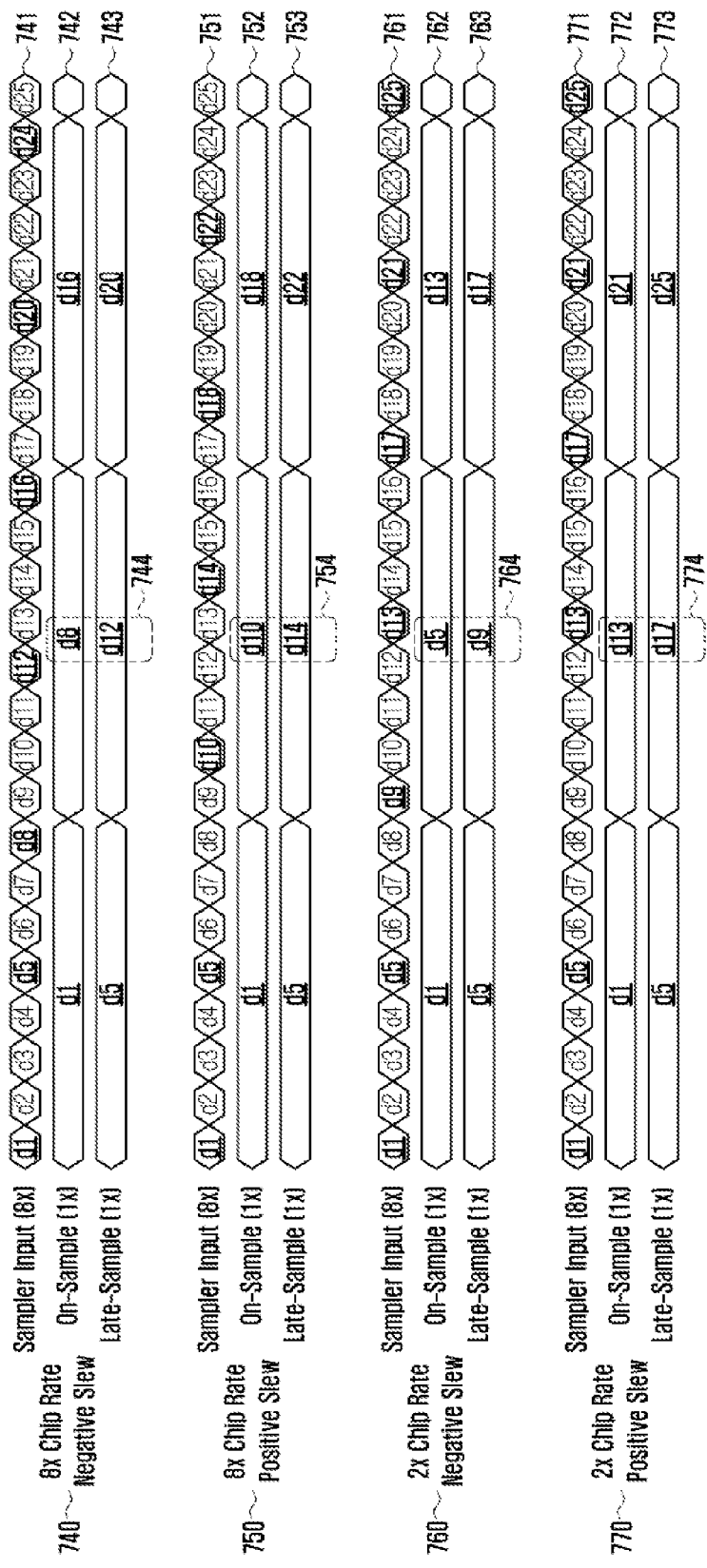

FIGS. 9 and 10 are diagrams illustrating a slew control operation of a channel estimation apparatus according to an exemplary embodiment of the present invention. In the exemplary embodiment of FIGS. 9 and 10, an exemplary slew control operation of a slew buffer/sampler under the control of a channel estimation controller of a channel estimator is illustrated. In the exemplary embodiment of FIGS. 9 and 10, the slew buffer/sampler may be the slew buffer/sampler 312 of FIG. 5, the channel estimation controller may be the channel estimation controller 318 of FIG. 5, and the channel estimator may be the channel estimator 216 of FIG. 4.

Referring to FIGS. 9 and 10, one chip duration is composed of 8 samples. In the exemplary embodiment of FIGS. 9 and 10, the description is made under the assumption of maximum 8× chip rate slew control, whereby a matched filter, such as the matched filter 214 of FIG. 4, converts the 1 chip signal to a digital signal of 8 samples and the channel estimator receives the 8 samples in the 1 chip duration. That is, the channel estimator requires a sampler input of the 8× chip rate.

Referring to FIGS. 9 and 10, the reference numeral 710 denotes operations of the slew buffer and the on-late sampler in the normal operation with no slew. The channel estimation controller selects the no slew control in the procedures of FIGS. 7 and 8 when the maximum power position and the reference position are matched with each other and the predict metric is not less than the negative threshold and not greater than the positive threshold. The 8× chip rate input as denoted by reference numeral 711 should be applied to the slew buffer/sampler, and the on-sample output as denoted by reference numeral 712 and the 1× chip rate output as denoted by reference numeral 713 are maintained.

The reference numeral 720 denotes operations of the slew buffer and the on-late sampler in 4× chip rate negative slew. The channel estimation controller selects the 4× chip rate negative slew control and controls the slew buffer/sampler to perform the slew control when the reference position value is greater than the maximum power position value and the difference between the reference position value and the maximum power position value is less than the 2× slew rate threshold in the procedure of FIG. 7. The 8× chip rate input is denoted by reference numeral 721, the on-sample input is denoted by reference numeral 722, and the 1× chip rate output is denoted by reference numeral 723. Reference numeral 724 denotes the position where the 4× chip rate negative slew occurs. As compared to the normal operation state, it is shown that the on-sample is adjusted from d9 to d7 and the late-sample is adjusted from d13 to d11 rapidly by as much as ¼ chip to be output. Reference numeral 730 denotes operations of the slew buffer and on-late sampler in 4× chip rate positive slew. The channel estimation controller selects the 4× chip rate positive slew control and controls the slew buffer/sampler to perform the slew control when the maximum power position value is greater than the reference position value and the difference between the maximum power position value and the reference position value is less than the 2× slew rate threshold. The 8× chip rate input is denoted by reference numeral 731, the on-sample output is denoted by reference numeral 732, and the 1× chip rate output is denoted by reference numeral 733. It is shown that the on-sample is adjusted from d9 to d11 and the late-sample is adjusted from d13 to d15 slowly by as much as ¼ to be output at the time point, as denoted by reference numeral 734, where the slew occurs.

Reference numerals 740 and 750 denote operations of the 8× chip rate slew control. For the 8× chip rate negative slew as denoted by reference numeral 740, the 8× chip rate input is denoted by reference numeral 741, the on-sample output is denoted by reference numeral 742, and the 1× chip rate output is denoted by reference numeral 743. For the 8× chip rate positive slew as denoted by reference numeral 750, the 8× chip rate input is denoted by reference numeral 751, the on-sample output is denoted by reference numeral 752, and the 1× chip rate output is denoted by reference numeral 753. The channel estimation controller controls to perform the 8× chip rate slew control when the maximum power position and the reference position are identical with each other in FIG. 7 and the predict metric is less than the negative threshold value or greater than the positive threshold value in FIG. 8. In the exemplary case of the 8× chip rate negative slew (when the maximum power position and the reference position are matched with each other) as denoted by reference numeral 740, it is shown that the on-sample is adjusted from d9 to d8 and the late-sample is adjusted from d13 to d12 rapidly at the time point, denoted by reference numeral 744, where the slew occurs. In the exemplary case of the 8× chip rate positive slew (when the maximum power position and the reference power position match with each other, and the predict metric is greater than the positive threshold) as denoted by reference numeral 750, it is shown that the on sample is adjusted from d9 to d10 and the late-sample is adjusted from d13 to d14 slowly by as much as ⅛ chip at the time point, denoted by reference numeral 754, to be output.

Reference numeral 760 denotes operations of 2× chip rate negative slew. For the 2× chip rate negative slew as denoted by reference numeral 760, the 8× chip rate input is denoted by reference numeral 761, the on-sample output is denoted by reference numeral 762, and the 1× chip rate output is denoted by reference numeral 763. The channel estimator selects the 2× chip rate negative slew and controls the slew buffer/sampler to perform the slew control when the reference position value is greater than the maximum power position value and the difference between the reference position value and the maximum power position value is greater than the 2× slew rate threshold. The position denoted by reference numeral 764 is the time point where the 2× chip rate negative slew occurs. As compared to the normal operation, it is shown that the on-sample is adjusted from d9 to d5 and the late-sample is adjusted from d13 to d9 rapidly by as much as ½ chip to be output. Reference numeral 770 denotes operations of the 2× chip rate positive slew. For the 2× chip rate positive slew as denoted by reference numeral 770, the 8× chip rate input is denoted by reference numeral 771, the on-sample output is denoted by reference numeral 772, and the 1× chip rate output is denoted by reference numeral 773. The channel estimation controller selects the 2× chip rate positive slew and controls the slew buffer/sampler to perform the slew control when the maximum power position value is greater than the reference position value and the difference between the maximum power position value and the reference position value is greater than the 2× slew rate threshold. In this case, the on-sample is adjusted from d9 to d13 and the late-sample is adjusted from d13 to d17 slowly by as much as ½ chip in timing to be output at the time point, denoted by reference numeral 774, where the slew occurs.

The channel estimation method of an exemplary embodiment of the present invention is capable of performing 2×, 4×, and 8× chip rate slew control since the sampler of the channel estimator allows for the 8× chip rate input. Accordingly, if the number of samples is set to a domination number of 2 (2n, n=1, 2, 3, . . . ) in the matched filter and the threshold values and predict metrics for comparison between the maximum power position and reference position are set in the channel estimator, it is possible to perform the slew control at various chip rates (4×, 8×, 16×, 32×, . . . ).

Figure 11:
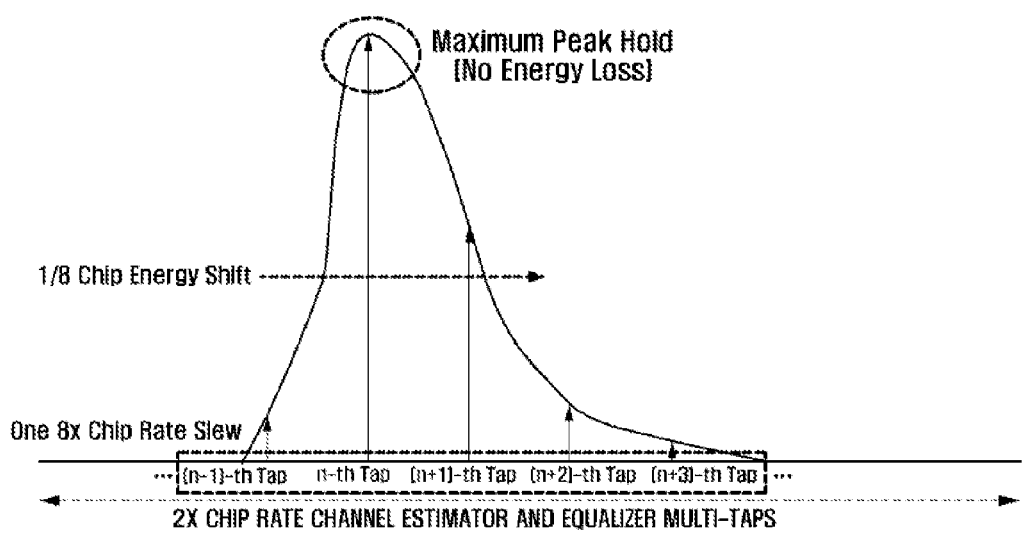
FIGS. 11 and 12 are graphs illustrating multi-tap energy distributions under the slew control of the channel estimator and equalizer of the channel estimation apparatus according to an exemplary embodiment of the present invention.
Figure 12:
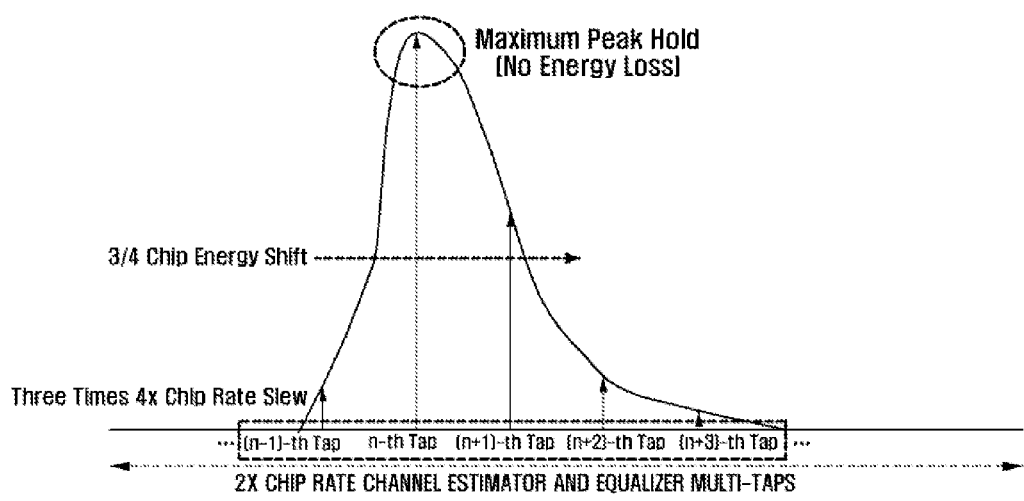

FIGS. 11 and 12 are graphs illustrating multi-tap energy distributions under the slew control of a channel estimator and equalizer of a channel estimation apparatus according to an exemplary embodiment of the present invention. FIG. 11 shows the energy distribution shifted by as much as ⅛ chip in a time-varying multipath fading channel under the slew control, and FIG. 12 shows the energy distribution shifted by as much as ¾ chip in a time-varying multipath fading channel under the slew control.

Referring to FIG. 11, when the ⅛ chip energy shift is detected (as denoted by reference numeral 754 in FIGS. 9 and 10), the channel estimator and equalizer performs ⅛ chip rate slew control so as to track the reception energy shift caused by the time-varying multipath fading channel accurately, resulting in fine matching between the reference position of the receiver and the maximum power position of the received signal. This means that the channel estimation method and apparatus according to an exemplary embodiment of the present invention can track the shift occurred even in the ⅛ chip resolution and hold the maximum peak position to the tap position accurately.

Referring to FIG. 12, when ¾ chip energy shift is detected (as denoted by reference numeral 724 of FIGS. 9 and 10), the channel estimator and equalizer performs ¼ chip rate negative slew control (or successive ½ chip rate positive slew control and ¼ chip rate positive slew control) so as to track the reception energy shift caused by the time-varying multipath fading channel accurately, resulting in fine matching between the reference position of the receiver and the maximum power position of the received signal. This means that the channel estimation method and apparatus according to an exemplary embodiment of the present invention can track the shift even in the ¼ chip resolution and hold the maximum peak position to the tap position accurately.

As described above, the channel estimation apparatus and method according to exemplary embodiments of the present invention can track the energy distribution shift of the received signal caused by the time-varying multipath fading channel in 1/X chip resolution using the adaptive chip rate slew control to hold the energy distribution of the received signal within the range of the multi-tap of the channel estimator and equalizer, thereby finely matching the maximum energy position of the received signal with the multi-tap position. Also, the channel estimation apparatus and method according to exemplary embodiments of the present invention provide a fine chip rate fast self-tracking algorithm and path energy prediction slew control, and it can be adopted for a receiver structure for high data rate wireless communication systems such as WCDMA and HSDPA to improve the reception performance even in the time-varying multipath fading environment such as high mobility environment and complex geographical obstacle-featured environment.

While the invention has been shown and described with reference to certain exemplary embodiments thereof, it will be understood by those skilled in the art that various changes in form and details may be made therein without departing from the spirit and scope of the invention, as defined by the appended claims and their equivalents.

What is claimed is:

1. A mobile terminal, the mobile terminal comprising:
   a receiver for converting a received radio signal into a baseband signal;
   a match filter for converting the baseband signal into a digital signal including at least two samples;
   a channel estimator for buffering the samples, for analyzing multipath signals to predict a maximum power position and multipath energy, and for estimating a channel by selecting a multi-tap at a maximum energy position through a slew control;
   an equalization controller for calculating an equalization tap gain using the multi-tap selected by the channel estimator; and
   an equalizer for compensating for distortion in samples output by the channel estimator using the equalization tap gain calculated by the equalization controller.

2. The mobile terminal of claim 1, wherein the channel estimator comprises:
   a slew buffer/sampler including a slew buffer and an on/late sampler supporting at least an 8× sample rate and outputting on/late samples of corresponding taps according to a slew control signal;
   a Pseudo Noise (PN) sequence generator for generating a PN sequence;
   a multi-tap subchannel estimator for performing a parallel channel estimation to the multiple taps using the on/late samples and the PN sequence and for outputting channel estimation values to the equalization controller according to a multi-tap lock control signal;
   a channel estimation controller for analyzing a delay profile, for predicting the multipath energy based on the channel estimation values output by the multi-tap subchannel estimator to select a slew control value, for providing a slew control signal containing the slew control value to the slew buffer/sampler, and for providing the multi-tap lock control signal to the multi-tap subchannel estimator and the PN sequence generator; and
   a chip buffer for buffering the on/late samples and for outputting the on/late samples to the equalizer.

3. The mobile terminal of claim 2, wherein the channel estimation controller comprises:
   a delay profile analyzer for analyzing the delay profile of a multipath fading channel to determine the maximum power position;
   a path energy predictor for predicting a shift of multi-tap energy by observing energy distribution of the multipath fading channel; and
   a slew controller for determining a chip rate between a reference position and the maximum power position based on an output of the delay profile analyzer and the path energy predictor.

4. The mobile terminal of claim 3, wherein the delay profile analyzer calculates time average powers of individual taps using the channel estimation values obtained from the signal received through the multipath fading channel, calculates a moving average of each tap using the time average power, and determines a position having a maximum power value using the moving average.

5. The mobile terminal of claim 4, wherein the time average powers of individual taps is calculated using an equation:

$$P_n(t) = \frac{1}{N_\tau} \sum_{\tau=t-N_\tau+1}^{t} |h_n(t)|^2$$

where $p_n(t)$ denotes the time average power of an $n^{th}$ channel tap, $h_n(t)$ is the channel estimation value of an $n^{th}$ channel tap at time t, and $N_\tau$ denotes a window size for calculating the time average power.

6. The mobile terminal of claim 4, wherein the moving average of each tap is calculated using an equation:

$$MA_n(t) = \frac{1}{N_{MA}} \sum_{i=n}^{n+N_{MA}-1} P_n(t)$$

where $MA_n(t)$ denotes the moving average of an $n^{th}$ channel tap at time t, $N_{MA}$ denotes a moving average window size of an $n^{th}$ channel tap at time t and can be set to a value less than a number of channel taps N (n=1, 2, 3, . . . , N), and $P_n(t)$ is a time average power obtained through the time averaging of an $n^{th}$ channel tap at time t.

7. The mobile terminal of claim 4, wherein the slew controller compares the maximum power position and the reference position with each other, generates a preset rate negative slew control signal, when the maximum power position is less than the reference position, according to difference between the maximum power position and the reference position, and generates a preset rate positive slew control signal, when the maximum power position is greater than the reference position, according to the difference between the maximum power position and the reference position.

8. The mobile terminal of claim 7, wherein the path energy predictor calculates, when the maximum power position is identical with the reference position, a first difference between a moving average reception power at the reference position and a moving average reception power at a position preceding the reference position and a second difference between a moving average reception power at the reference position and a moving average reception power at a position following the reference position and generates a predict metric by dividing the first difference by the second difference.

9. The mobile terminal of claim 8, wherein the slew controller generates a fine slew control signal indicating a preset chip rate positive slew control, when the predict metric is less than a negative threshold value, a fine slew control signal indicating a preset chip rate negative slew control when the predict metric is greater than a positive threshold value, and a no slew control signal when the predict metric is not less than the negative threshold value and not greater than the positive threshold value.

10. A channel estimation method of a mobile terminal, the method comprising:
- converting a received radio signal into a digital signal having at least 8 samples in a chip duration;
- estimating a channel by buffering the samples;
- predicting a maximum power position and predicting multipath energy through multipath channel signal analysis;
- selecting a multi-tap at a maximum energy position by slew control according to the maximum power position and the multipath energy;
- controlling equalization for calculating an equalization tap gain using the multi-tap; and
- compensating for a distortion in samples output as a result of the channel estimation using the equalization tap gain.

11. The method of claim 10, wherein the estimating of the channel comprises:
- buffering on and late samples separately;
- performing parallel channel estimation on the multi-tap using the on and late samples and a Pseudo Noise (PN) sequence;
- selecting a slew control value by analyzing a delay profile and predicting multipath energy from the multi-tap channel estimation values; and
- outputting a sample selected by the slew control and multi-tap channel estimation values.

12. The method of claim 10, wherein the estimating of the channel comprises:
- determining the maximum power position by analyzing a delay profile of a multipath channel;
- predicting a shift of multi-tap energy by observing energy distribution of the multipath channel;
- selecting a chip rate between a reference position and the maximum power position based on a result of delay profile analysis and the path energy prediction; and
- generating a slew control signal of the selected chip rate.

13. The method of claim 12, wherein the analyzing of the delay profile comprises:
- calculating time average powers of individual taps using channel estimation values obtained from signal received from the multipath channel;
- calculating a moving average of each tap using the time average power; and
- determining a position having a maximum power value using the moving average.

14. The method of claim 13, wherein the time average powers of individual taps is calculated using an equation:

$$P_n(t) = \frac{1}{N_\tau} \sum_{\tau=t-N_\tau+1}^{t} |h_n(t)|^2$$

where $p_n(t)$ denotes the time average power of an $n^{th}$ channel tap, $h_n(t)$ is the channel estimation value of an $n^{th}$ channel tap at time t, and $N_\tau$ denotes a window size for calculating the time average power.

15. The method of claim 13, wherein the moving average of each tap is calculated using an equation:

$$MA_n(t) = \frac{1}{N_{MA}} \sum_{i=n}^{n+N_{MA}-1} P_n(t)$$

where $MA_n(t)$ denotes the moving average of an $n^{th}$ channel tap at time t, $N_{MA}$ denotes a moving average window size of an $n^{th}$ channel tap at time t and can be set to a value less than a number of channel taps N (n=1, 2, 3, ..., N), and $P_n(t)$ is a time average power obtained through the time averaging of an $n^{th}$ channel tap at time t.

16. The method of claim 13, wherein the generating of the slew control signal comprises:
- comparing the maximum power position and the reference position with each other;
- generating a preset rate negative slew control signal, when the maximum power position is less than the reference position, according to difference between the maximum power position and the reference position; and
- generating a preset rate positive slew control signal, when the maximum power position is greater than the reference position, according to the difference between the maximum power position and the reference position.

17. The method of claim 16, wherein the generating of the slew control signal comprises:
- generating, when the maximum power position is identical with the reference position, a predict metric by calculating a first difference between a moving average reception power at the reference position and a moving average reception power at a position preceding the reference position and a second difference between a moving average reception power at the reference position and a moving average reception power at a position following the reference position and dividing the first difference by the second difference; and
- generating a fine slew control signal indicating a preset chip rate positive slew control when the predict metric is less than a negative threshold value, a fine slew control signal indicating a preset chip rate negative slew control when the predict metric is greater than a positive threshold value, and a no slew control signal when the predict metric is not less than the negative threshold value and not greater than the positive threshold value.

* * * * *